(12) United States Patent
Fasogbon et al.

(10) Patent No.: US 11,336,812 B2
(45) Date of Patent: May 17, 2022

(54) STORAGE AND SIGNALING OF ENTRANCE PUPIL PARAMETERS FOR IMMERSIVE MEDIA

(71) Applicant: Nokia Technologies Oy, Espoo (FI)

(72) Inventors: Peter O. Fasogbon, Tampere (FI); Emre B. Aksu, Tampere (FI); Miska M. Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 196 days.

(21) Appl. No.: 16/902,346

(22) Filed: Jun. 16, 2020

(65) Prior Publication Data

US 2021/0006700 A1 Jan. 7, 2021

Related U.S. Application Data

(60) Provisional application No. 62/870,468, filed on Jul. 3, 2019.

(51) Int. Cl.
*H04N 5/232* (2006.01)
*G06T 7/80* (2017.01)
*G02B 27/00* (2006.01)
*G06F 17/10* (2006.01)

(52) U.S. Cl.
CPC ......... *H04N 5/232* (2013.01); *G02B 27/0025* (2013.01); *G06F 17/10* (2013.01); *G06T 7/80* (2017.01)

(58) Field of Classification Search
CPC .... H04N 5/232; G02B 27/0025; G06F 17/10; G06T 7/80; G06T 2207/10004; G06T 3/0018
See application file for complete search history.

(56) References Cited

U.S. PATENT DOCUMENTS

| 9,807,359 | B1* | 10/2017 | Moule .............. G02B 13/0005 |
| 10,298,910 | B1* | 5/2019 | Kroeger ................ G06T 11/60 |
| 2013/0208083 | A1* | 8/2013 | Li .......................... G02B 13/06 |
| | | | 348/E7.001 |
| 2018/0336704 | A1* | 11/2018 | Javan Roshtkhari ... G06T 7/337 |
| 2019/0014305 | A1* | 1/2019 | Wang ................. H04N 5/23238 |
| 2019/0043219 | A1* | 2/2019 | Tezaur .............. H04N 5/23238 |

(Continued)

FOREIGN PATENT DOCUMENTS

WO WO 2019/175629 9/2019

OTHER PUBLICATIONS

Avinash et al., "On the Equivalence of Moving Entrance Pupil and Radial Distortion for Camera Calibration", 2015 IEEE International Conference on Computer Vision (ICCV) (Dec. 2015), pp. 2345-2353.

(Continued)

*Primary Examiner* — Mekonnen D Dagnew
(74) *Attorney, Agent, or Firm* — Alston & Bird LLP (57) ABSTRACT

A method, apparatus, and computer program product provide for receiving, storing, and providing parameters associated with an entrance pupil of an omnidirectional lens. In the context of a method, the method receives parameter information associated with an entrance pupil of an omnidirectional lens. The method stores one or more elements of the parameter information in one or more data structures. The method provides the one or more data structures for use in one or more image formation tasks.

18 Claims, 7 Drawing Sheets

(56) References Cited

U.S. PATENT DOCUMENTS

| | | | |
|---|---|---|---|
| 2019/0236805 A1* | 8/2019 | Mou | G06T 5/006 |
| 2020/0294269 A1* | 9/2020 | Tezaur | G06T 3/0062 |
| 2021/0006700 A1* | 1/2021 | Fasogbon | G06F 17/10 |

OTHER PUBLICATIONS

Extended European Search Report for European Application No. 20180409.3 dated Oct. 22, 2020, 9 pages.

Fasogbon et al., "Calibration of Fisheye Camera Using Entrance Pupil", 2019 IEEE International Conference on Image Processing (ICIP) (Sep. 22, 2019), pp. 469-473.

Gennery, D., "Generalized Camera Calibration Including Fish-Eye Lenses", International Journal of Computer Vision, Kluwer Academic Publishers, Bo, vol. 68, No. 3 (May 2006), pp. 239-266.

Ryberg et al., "Analysis and Evaluation of a General Camera Model", Computer Vision and Image Understanding, vol. 115, No. 11 (Jun. 28, 2011), pp. 1503-1515.

WD 5 of ISO/IEC 23090-7 Metadata for Immersive Media, N18396 (Mar. 29, 2019) 42 pages.

WD5 of ISO/IEC 23090-2 OMAF $2^{nd}$ edition (May 16, 2019) 243 pages.

Grossberg, M. D. et al., *A General Imaging Model and a Method for Finding Its Parameters*, IEEE (2001) 108-115.

Kumar, A. et al., *Generalized Pupil-Centric Imaging and Analytical Calibration for a Non-Frontal Camera*, 2014 IEEE Conference on Computer Vision and Pattern Recognition (2014) 3970-3977.

Scaramuzza, D., *OCamCalib: Omnidirectional Camera Calibration Toolbox for Matlab* [online] [retrieved Jul. 17, 2020]. Retrieved via the Internet: https://web.archive.org/web/20171101064249/https://sites.google.com/site/scarabotix/ocamcalid-toolbox (Nov. 1, 2017) 30 pages.

Swaminathan, R. et al., *Caustics of Catadioptric Cameras*, IEEE (2001) 2-9.

OpenCV: Camera Calibration [online] [retrieved Jul. 17, 2020]. Retrieved via the Internet: https://web.archive.org/web/20190203014943/http://docs.opencv.org/3.1.0/dc/dbb/tutorial_py_calibration.html (Feb. 3, 2019) 4 pages.

\* cited by examiner

STORAGE AND SIGNALING OF ENTRANCE PUPIL PARAMETERS FOR IMMERSIVE MEDIA

CROSS-REFERENCE TO RELATED APPLICATIONS

This application claims priority to U.S. Provisional Patent Application No. 62/870,468, titled "STORAGE AND SIGNALING OF ENTRANCE PUPIL PARAMETERS FOR IMMERSIVE MEDIA," and filed Jul. 3, 2019, the contents of which are hereby incorporated by reference in their entirety.

TECHNOLOGICAL FIELD

An example embodiment relates generally to camera calibration, and, more particularly, to techniques for storing and signaling entrance pupil parameters for enabling effective image formation tasks.

BACKGROUND

Camera calibration aims to solve the mapping between three-dimensional (3D) coordinates of observable points in the real world to their corresponding two-dimensional (2D) image projection using an optical imaging lens. This process typically involves estimating intrinsic and/or extrinsic parameters, with intrinsic parameters being dependent on certain characteristics of the lens and sensors, and extrinsic parameters being dependent on the relative position and orientation of the camera in the world. These sets of parameters form what is known as the calibration set, and thus represent the model of the camera, and when computed, the camera is said to be calibrated.

Most conventional camera calibration algorithms assume that the imaging device has a single viewpoint (SVP), where all incidence light rays are expected to pass through the optical center of the lens. However, this assumption is not necessarily true for special omnidirectional imaging devices such as those equipped with a fisheye lens such that the calibration of these special omnidirectional imaging devices with a conventional camera calibration algorithm may not always be accurate.

BRIEF SUMMARY

A method, apparatus, and computer program product are disclosed for storing and signaling parameters associated with an entrance pupil of a lens. In this regard, the method, apparatus and computer program product are configured receive parameter information associated with an entrance pupil of an omnidirectional lens, store one or more elements of the parameter information in one or more data structures, and provide the one or more data structures for use in one or more image formation tasks, such as tasks associated with an omnidirectional media standard. By providing for these entrance pupil parameters to be supplemented into image formation tasks such as immersive video algorithms and methods, lens distortion introduced in an image and caused by variation and positioning of an entrance pupil may be accurately corrected. Benefits of this design include visual improvement in applications including but not limited to scene rendering and content playback for omnidirectional lenses including, for example, fisheye lenses.

In an example embodiment, a method is provided for receiving parameter information associated with an entrance pupil of an omnidirectional lens. The parameter information comprises one or more entrance pupil coefficients and an amount of entrance pupil coefficients. In some embodiments, the parameter information further comprises entrance pupil distortion correction parameters with local variation of field-of-view, wherein the entrance pupil distortion correction parameters are used to correct a camera_centre_offset ($O_Z$) to its real optical center ($C_W$) in an external camera coordinate. In an embodiment, full correction under a varying entrance pupil equates to $\theta = \sum_{j=0}^{N_i-1} p_j * r^j + EP(\theta)$. In some embodiments, the parameter information further comprises an entrance pupil flag variable for use in a fisheye video supplemental information structure. The method also comprises storing one or more elements of the parameter information in one or more data structures. In certain embodiments, storing one or more elements of the parameter information in one or more data structures comprises storing the entrance pupil coefficients and number of entrance pupil coefficients. The method further comprises providing the one or more data structures for use in one or more image formation tasks. In an embodiment, the one or more image formation tasks are associated with an omnidirectional media standard. In an embodiment, the omnidirectional media standard is Moving Pictures Experts Group (MPEG) Omnidirectional Media Format(OMAF) or MPEG ISO/IEC 23090-7. In some embodiments, providing the one or more data structures for use in one or more image formation tasks comprises providing the data structures for use in a method for conversion from a sample location of an active area in a fisheye decoded picture to sphere coordinates relative to global coordinate axes. In some embodiments, the conversion from a sample location of an active area in a fisheye decoded picture to sphere coordinates relative to global coordinate axes comprises determining an angle $\phi'$, wherein $\phi'$ is one of two sphere coordinates in degrees relative to the global coordinate axes. In one or more embodiments, the one or more data structures comprises a clause to instruct the method of converting a sample location of an active area in a fisheye decoded picture to sphere coordinates relative to a global coordinate axis to not use entrance pupil coefficients in the conversion if the number of entrance pupil coefficients is zero. In some embodiments, the angle $\phi'$ is derived by $$\phi' = \sum_{j=0}^{numCoeffs-1} \left((coeffVal[j]*2^{-24}) * \left(Sqrt((x-x_c*2^{-16})^2 + (y-y_c*2^{-16})^2) \div ((r_c+EP)*2^{-16})\right)^j\right),$$

wherein x and y represent camera coordinates and $x_c$, $y_c$, $z_c = r_c$ represent normalized camera coordinates. In an embodiment, $$EP = \sum_{j=0}^{numCoeffs-1} \left((EPcoeffVal[j]*2^{-24}) * \left(Sqrt((x-x_c*2^{-16})^2 + (y-y_c*2^{-16})^2) \div (r_c*2^{-16})\right)^j\right),$$

wherein x and y represent camera coordinates and $x_c$, $y_c$, $z_c = r_c$ represent normalized camera coordinates. In some embodiments, storing one or more elements of the parameter information in one or more data structures comprises storing the entrance pupil coefficients and number of entrance pupil coefficients. In certain embodiments, the one or more data structures are provided as metadata. In certain embodiments, the parameter information further comprises a polynomial EP_coeffs, wherein instances of EP_coeffs are fixed-point or floating-point polynomial coefficient values that describe a curve function using entrance pupil equation $EP(\theta)=\sum_{j=3}^{N_i^2-1} p_j^2 * r^j$, wherein $p_j^2$ and $N_i^2$ are represented by EP_coeffs and num_EP_coeffs, respectively. In one or more embodiments, providing the one or more data structures for use in one or more image formation tasks comprises providing the entrance pupil flag variable to the fisheye video supplemental information structure.

In a further example embodiment, a computer program product is provided that comprises a non-transitory computer readable storage medium having program code portions stored thereon with the program code portions configured, upon execution, to receive parameter information associated with an entrance pupil of an omnidirectional lens. The parameter information comprises one or more entrance pupil coefficients and an amount of entrance pupil coefficients. In some embodiments, the parameter information further comprises entrance pupil distortion correction parameters with local variation of field-of-view, wherein the entrance pupil distortion correction parameters are used to correct a camera_centre_offset ($O_Z$) to its real optical center ($C_W$) in an external camera coordinate. In an embodiment, full correction under varying entrance pupil equates to $\theta = \sum_{j=0}^{N_i-1} p_j * r^j + EP(\theta)$. In some embodiments, the parameter information further comprises an entrance pupil flag variable for use in a fisheye video supplemental information structure. The program code portions are further configured, upon execution, to store one or more elements of the parameter information in one or more data structures. In certain embodiments, storing one or more elements of the parameter information in one or more data structures comprises storing the entrance pupil coefficients and number of entrance pupil coefficients. The program code portions are additionally configured, upon execution, to further provide the one or more data structures for use in one or more image formation tasks. In an embodiment, the one or more image formation tasks are associated with an omnidirectional media standard. In an embodiment, the omnidirectional media standard is MPEG-OMAF or MPEG ISO/IEC 23090-7. In some embodiments, providing the one or more data structures for use in one or more image formation tasks comprises providing the data structures for use in a method for conversion from a sample location of an active area in a fisheye decoded picture to sphere coordinates relative to a global coordinate axes. In some embodiments, the conversion from a sample location of an active area in a fisheye decoded picture to sphere coordinates relative to a global coordinate axes comprises determining an angle $\phi'$, wherein $\phi$ is one of two sphere coordinates in degrees relative to the global coordinate axes. In one or more embodiments, the one or more data structures comprises a clause to instruct the method of converting a sample location of an active area in a fisheye decoded picture to sphere coordinates relative to global coordinate axes to not use entrance pupil coefficients in the conversion if the number of entrance pupil coefficients is zero. In some embodiments, the angle $\phi'$ is derived by $$\phi' = \sum_{j=0}^{numCoeffs-1} \left((coeffVal[j]*2^{-24}) * \left(\text{Sqrt}((x-x_c*2^{-16})^2 + (y-y_c*2^{-16})^2) \div ((r_c+EP)*2^{-16})\right)^j\right),$$

wherein x and y represent camera coordinates and $x_c$, $y_c$, $z_c \equiv r_c$ represent normalized camera coordinates. In an embodiment, EP=

$$\sum_{j=0}^{numCoeffs-1} \left((EPcoeffVal[j]*2^{-24}) * \left(\text{Sqrt}((x-x_c*2^{-16})^2 + (y-y_c*2^{-16})^2) \div (r_c*2^{-16})\right)^j\right),$$

wherein x and y represent camera coordinates and $x_c$, $y_c$, $z_c \equiv r_c$ represent normalized camera coordinates. In some embodiments, storing one or more elements of the parameter information in one or more data structures comprises storing the entrance pupil coefficients and number of entrance pupil coefficients. In one or more embodiments, the omnidirectional media standard is in accordance with MPEG-OMAF or MPEG ISO/IEC 23090-7 standards. In an embodiment, the one or more data structures are provided as metadata. In certain embodiments, the parameter information further comprises a polynomial EP_coeffs, wherein instances of EP_coeffs are fixed-point or floating-point polynomial coefficient values that describe a curve function using entrance pupil equation $EP(\theta)=\sum_{j=3}^{N_i^2-1} p_j^2 * r^j$, wherein $p_j^2$ and $N_i^2$ are represented by EP_coeffs and num_EP_coeffs, respectively. In one or more embodiments, providing the one or more data structures for use in one or more image formation tasks comprises providing the entrance pupil flag variable to the fisheye video supplemental information structure.

In a further example embodiment, an apparatus is provided comprising at least one processor; and at least one memory including computer program code configured to, with the at least one processor, cause the apparatus at least to receive parameter information associated with an entrance pupil of an omnidirectional lens. The parameter information comprises one or more entrance pupil coefficients and an amount of entrance pupil coefficients. In some embodiments, the parameter information further comprises entrance pupil distortion correction parameters with local variation of field-of-view, wherein the entrance pupil distortion correction parameters are used to correct a camera_centre_offset ($O_Z$) to its real optical center ($C_W$) in an external camera coordinate. In an embodiment, full correction under varying entrance pupil equates to $\theta = \sum_{j=0}^{N_i-1} p_j * r^j + EP(\theta)$. In some embodiments, the parameter information further comprises an entrance pupil flag variable for use in a fisheye video supplemental information structure. The apparatus is further configured to store one or more elements of the parameter information in one or more data structures. In certain embodiments, storing one or more elements of the parameter information in one or more data structures comprises storing the entrance pupil coefficients and number of entrance pupil coefficients. The apparatus is further configured to provide the one or more data structures for use in one or more image formation tasks. In an embodiment, the one or more image formation tasks are associated with an omnidirectional media standard. In an embodiment, the omnidirectional media standard is MPEG-OMAF or MPEG ISO/IEC 23090-7. In some embodiments, providing the one or more data structures for use in one or more image formation tasks comprises providing the data structures for use in a method for conversion from a sample location of an active area in a fisheye decoded picture to sphere coordinates relative to a global coordinate axes. In some embodiments, the conversion from a sample location of an active area in a fisheye decoded picture to sphere coordinates relative to a global coordinate axes comprises determining an angle $\phi'$, wherein $\phi'$ is one of two sphere coordinates in degrees relative to the global coordinate axes. In one or more embodiments, the one or more data structures comprises a clause to instruct the method of converting a sample location of an active area in a fisheye decoded picture to sphere coordinates relative to a global coordinate axes to not use entrance pupil coefficients in the conversion if the number of entrance pupil coefficients is zero. In some embodiments, the angle $\phi'$ is derived by $$\phi' = \sum_{j=0}^{numCoeffs-1} \left( (coeffVal[j] * 2^{-24}) * \left( Sqrt((x - x_c * 2^{-16})^2 + (y - y_c * 2^{-16})^2) \div ((r_c + EP) * 2^{-16}) \right)^j \right),$$

wherein x and y represent camera coordinates and $x_c$, $y_c$, $z_c \equiv r_c$ represent normalized camera coordinates. In an embodiment, $EP = ((EPcoeffVal[j] * 2^{-24}) * (Sqrt((x-x_c * 2^{-16})^2 + (y-y_c * 2^{-16})^2) \div (r_c * 2^{-16}))$, wherein x and y represent camera coordinates and $x_c$, $y_c$, $z_c \equiv r_c$ represent normalized camera coordinates. In some embodiments, storing one or more elements of the parameter information in one or more data structures comprises storing the entrance pupil coefficients and number of entrance pupil coefficients. In an embodiment, the one or more data structures are provided as metadata. In certain embodiments, the parameter information further comprises a polynomial EP_coeffs, wherein instances of EP_coeffs are fixed-point or floating-point polynomial coefficient values that describe a curve function using entrance pupil equation $EP(\theta) = \sum_{j=3}^{N_i^2-1} p_j^2 * r^j$, wherein $p_j^2$ and $N_i^2$ are represented by EP_coeffs and num_EP_coeffs, respectively. In one or more embodiments, providing the one or more data structures for use in one or more image formation tasks comprises providing the entrance pupil flag variable to the fisheye video supplemental information structure.

In an example embodiment, an apparatus is provided that comprises means for receiving parameter information associated with an entrance pupil of an omnidirectional lens. The parameter information comprises one or more entrance pupil coefficients and an amount of entrance pupil coefficients. In some embodiments, the parameter information further comprises entrance pupil distortion correction parameters with local variation of field-of-view, wherein the entrance pupil distortion correction parameters are used to correct a camera_centre_offset ($O_Z$) to its real optical center ($C_W$) in an external camera coordinate. In an embodiment, full correction under varying entrance pupil equates to $\theta = \sum_{j=0}^{N_i-1} p_j * r^j + EP(\theta)$. In some embodiments, the parameter information further comprises an entrance pupil flag variable for use in a fisheye video supplemental information structure. The apparatus further comprises means for storing one or more elements of the parameter information in one or more data structures. In certain embodiments, the means for storing one or more elements of the parameter information in one or more data structures comprises means for storing the entrance pupil coefficients and number of entrance pupil coefficients. The apparatus further comprises means for providing the one or more data structures for use in one or more image formation tasks. In an embodiment, the one or more image formation tasks are associated with an omnidirectional media standard. In some embodiments, the means for providing the one or more data structures for use in one or more image formation tasks comprises means for providing the data structures for use in a method for conversion from a sample location of an active area in a fisheye decoded picture to sphere coordinates relative to a global coordinate axes. In some embodiments, the conversion from a sample location of an active area in a fisheye decoded picture to sphere coordinates relative to a global coordinate axes comprises determining an angle $\phi'$, wherein $\phi'$ is one of two sphere coordinates in degrees relative to the global coordinate axes. In one or more embodiments, the one or more data structures comprises a clause to instruct the method of converting a sample location of an active area in a fisheye decoded picture to sphere coordinates relative to a global coordinate axes to not use entrance pupil coefficients in the conversion if the number of entrance pupil coefficients is zero. In some embodiments, the angle $\phi'$ is derived by $$\phi' = \sum_{j=0}^{numCoeffs-1} \left( (coeffVal[j] * 2^{-24}) * \left( Sqrt((x - x_c * 2^{-16})^2 + (y - y_c * 2^{-16})^2) \div ((r_c + EP) * 2^{-16}) \right)^j \right),$$

wherein x and y represent camera coordinates and $x_c$, $y_c$, $z_c \equiv r_c$ represent normalized camera coordinates. In an embodiment, $$EP = \sum_{j=0}^{numCoeffs-1} \left( (EPcoeffVal[j] * 2^{-24}) * \left( Sqrt((x - x_c * 2^{-16})^2 + (y - y_c * 2^{-16})^2) \div (r_c * 2^{-16}) \right)^j \right),$$

wherein x and y represent camera coordinates and $x_c$, $y_c$, $z_c \equiv r_c$ represent normalized camera coordinates. In some embodiments, the means for storing one or more elements of the parameter information in one or more data structures comprise means for storing the entrance pupil coefficients and number of entrance pupil coefficients. In an embodiment, the one or more data structures are provided as metadata. In certain embodiments, the parameter information further comprises a polynomial EP_coeffs, wherein instances of EP_coeffs are fixed-point or floating-point polynomial coefficient values that describe a curve function using entrance pupil equation $EP(\theta) = \sum_{j=3}^{N_i^2-1} p_j^2 * r^j$, wherein $p_j^2$ and $N_i^2$ are represented by EP_coeffs and num_EP_coeffs, respectively. In one or more embodiments, the means for providing the one or more data structures for use in one or more image formation tasks comprises means for providing the entrance pupil flag variable to the fisheye video supplemental information structure.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

An entrance pupil, in an optical system, is the optical image of the physical aperture (e.g., hole or opening through which light travels) stop as seen through the front of the lens system. Conventional camera calibration algorithms assume that the camera or other imaging device has a single viewpoint (SVP), comprising a stationary entrance pupil wherein all incidence rays are expected to pass through the optical center. These camera calibration algorithms involve estimating intrinsic and/or extrinsic parameters. Intrinsic parameters include parameters which are dependent on certain characteristics of the lens and sensors, such as image center, skew, distortion, focal length, and/or the like. Extrinsic parameters include parameters which are dependent on the relative position and orientation of the camera in the world. Projections that involve the use of a calibrated camera typically require this model for accurate transformation and/or calibration.

The accuracy of a calibration method is evaluated using the reprojection error between 3D coordinates and their 2D image projections. The reprojection error is a geometric error corresponding to the image distance between a projected point and a measured one, and is used to quantify how closely an estimate of a 3D point recreates the true projection of the 3D point. Thus, in an ideal scenario, accurate calibration would ensure a projection error of zero.

As described above, conventional camera calibration algorithms assume that the imaging device has an SVP. However, this is not necessarily true for special omnidirectional imaging devices, such as those equipped with wide-angle lenses such as fisheye lenses and/or the like. These types of devices may be considered to have a non-single viewpoint (NSVP). Fisheye lenses produce strong visual distortion intended to create a wide panoramic or hemispherical image and thus achieve extremely wide angles of view. Additionally, the center of the entrance pupil of a fisheye lens may vary in size or change position according to the direction of light rays. A fisheye lens covers a large field of view by taking advantage of a heavy overcorrected spherical aberration of powerful negative meniscus front elements, which cause strong deviation of the principal ray. This spherical aberration of the pupil causes the entrance pupil to move forward and off the axis and to tilt at wide angles of view. Cameras used by conventional imaging systems, which are systems using a combination of lenses and mirrors to project the incoming light onto the sensor in a single viewpoint are referred to as SVP, or central, cameras. The single viewpoint assumption is violated in the case of NSVP, or non-central, cameras (e.g., cameras using fisheye lenses). In non-central cameras, the locus of viewpoints form a caustic. The caustic is defined as the envelope of light rays reflected or refracted by a curved surface or object, or the projection of that envelope of rays on another surface.

For most optical lenses with a narrow field of view, the varying entrance pupil is small and thus may be ignored during camera calibration. However, this is not the case for special, wide field-of-view imaging devices such as fisheye lenses. A fisheye lens provides for several refractions and reflections in the imaging formation process because of a large number of optical elements incorporated therein. Generally, camera systems consist of several group of elements that guide the light towards the actual sensor surface. The smallest opening that appears in the light pathway is called the system aperture or stop. The interaction of the system aperture with the other forming elements are the pupils of the system. The entrance pupil is the actual stop seen through the elements preceding it, while the exit pupil is seen through the elements following it. An exit pupil is the image of the aperture stop as seen by the actual sensor surface. A single viewpoint assumption for fisheye camera calibration implies an unrealistic constraint on the entrance pupil location, which impacts the parameter's sensitivity and correctness. Therefore, the intrinsic camera calibration result is not always reliable.

Previous camera calibration methods use the assumption of SVP imaging devices and fail to take account of any entrance pupil variation or shift. Certain attempts at camera calibration methods that include entrance pupil variation intended to be suitable for fisheye lenses have proved to be inefficient as they are based on an extremely complex model with a high number of parameters. Many current calibration methods put a lot of unnecessary pressure on the optical lens model to simplify distortions introduced due to a varying entrance pupil. This tends to affect the accuracy of the calibration and proper estimation of the distortion parameters. Objects closer to the camera tend to be most impacted by the entrance pupil variation.

The Moving Picture Experts Group (MPEG) Omnidirectional Media Format (OMAF) specification section 7 (Metadata for Immersive Media Systems) allows storage of various fisheye camera parameters, such as intrinsic and extrinsic parameters, and defines formulas and image formation tasks to utilize the parameters. In this regard, the MPEG-OMAF specification defines common immersive media metadata focusing on immersive video, such as 360° video, images, audio, and timed text.

In an example embodiment, each incident light ray is corrected using a camera calibration model that considers the variation of the position of the entrance pupil. The angles of each incident light ray are calculated relative to a different location on an optical axis, thus a central, or SVP, camera model is not assumed. Entrance pupil parameters may then be estimated using non-linear optimization. In this regard, parameters associated with the entrance pupil may be stored and integrated into one or more data structures and image formation tasks, such as MPEG-OMAF image formation tasks. The entrance pupil parameters for any lens can be estimated by separating entrance pupil parameters as part of the extrinsic parameters. The entrance pupil variation tends to impact a Z-axis as part of the extrinsic parameters, while the X-axis and Y-axis corrections are left to be corrected as part of radial distortion under the intrinsic parameters.

In certain embodiments, these entrance pupil parameters may be seamlessly integrated as part of a supplementary data structure to improve sphere mapping operations and other image formation tasks associated with immersive video metadata and algorithms under MPEG-OMAF or other media standards.

Figure 1:
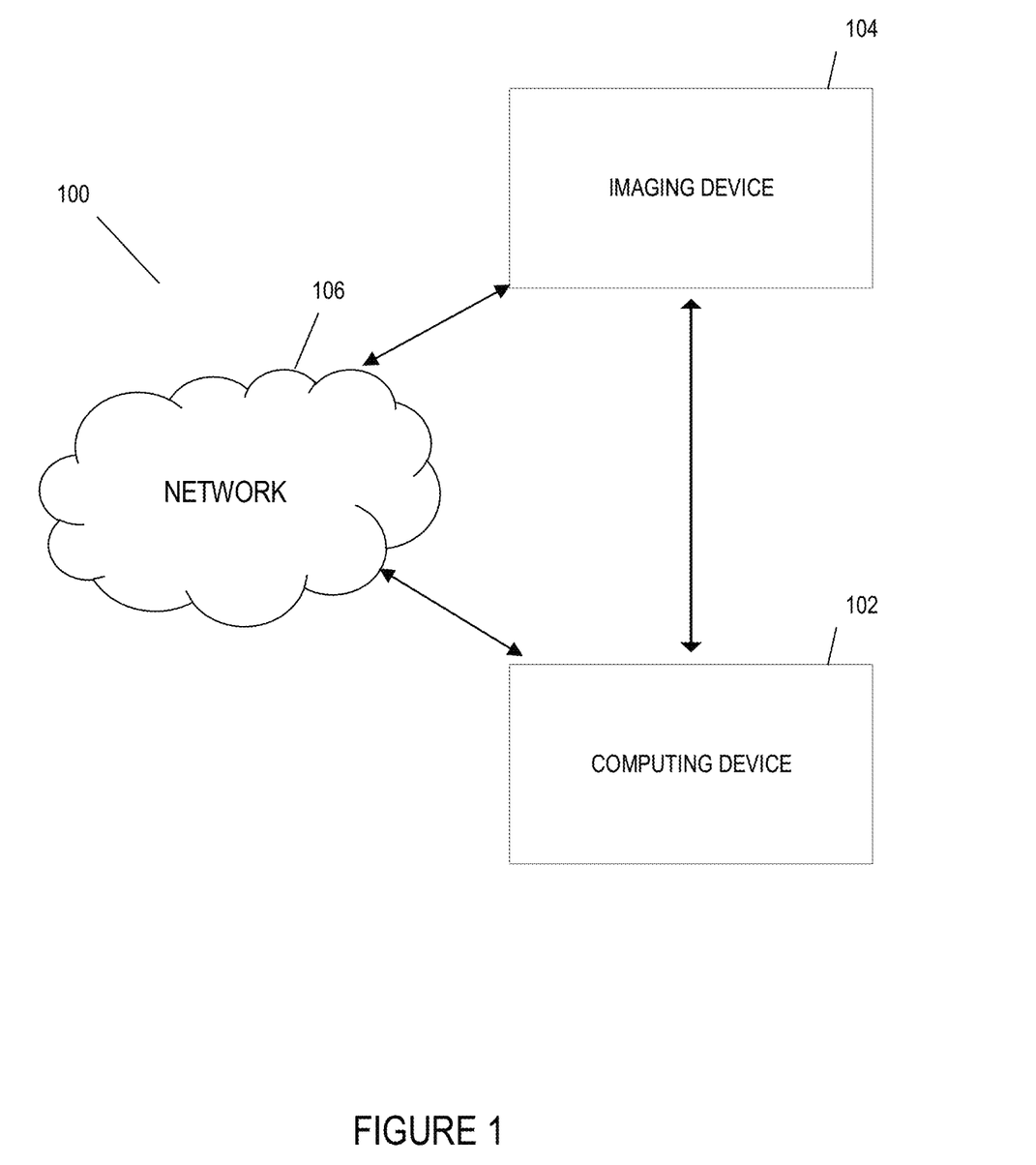
FIG. 1 is a block diagram of a system including an imaging device and a computing device configured to communicate via a network in accordance with an example embodiment.

Referring now to FIG. 1, a block diagram of a system 100 is illustrated for storing and signaling entrance pupil parameters for enabling effective image formation tasks, such as in conjunction with MPEG-OMAF, according to an example embodiment. It will be appreciated that the system 10 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for storing and signaling entrance pupil parameters for enabling effective image formation tasks, numerous other configurations may also be employed.

The system 100 may include one or more imaging devices 104 (also known as a camera, omnidirectional imaging device, fisheye lens, and/or the like), and/or one or more computing devices 102 (also known as a remote computing device, remote server, and/or the like). The system 100 may further comprise a network 106. The network 106 may comprise one or more wireline networks, one or more wireless networks, or some combination thereof. The network 106 may, for example, comprise a serving network (e.g., a serving cellular network) for one or more computing devices 102. The network 106 may comprise, in certain embodiments, one or more computing devices 102 and/or one or more imaging devices 104. According to example embodiments, the network 106 may comprise the Internet. In various embodiments, the network 106 may comprise a wired access link connecting one or more computing devices 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more computing devices 102 may be configured to connect directly with one or more imaging devices 104 via, for example, an air interface without routing communications via one or more elements of the network 106. Alternatively or additionally, one or more of the computing devices 102 may be configured to communicate with one or more of the imaging devices 104 over the network 106. In this regard, the imaging devices 104 may comprise one or more nodes of the network 106. For example, in some example embodiments, the imaging devices 104 may be at least partially embodied on one or more computing devices that comprise an element of a radio access network (RAN) portion of the network 106. In this regard, the streaming server apparatuses 104 may, for example, be at least partially embodied by an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the computing devices 102. In some embodiments, the imaging devices 104 may comprise an Access Network Discovery and Selection Function (ANDSF), and/or the like. Accordingly, each of the imaging devices 104 may comprise a network node or a plurality of network nodes collectively configured to perform one or more operations attributed to the imaging devices 104 as described with respect to various example embodiments disclosed herein.

According to various embodiments, the system 100 may be configured according to an architecture for providing for camera calibration. For example, the system 100 may be configured to provide for camera calibration and immersive video techniques, as defined by Moving Picture Experts Group (MPEG) Omnidirectional Media Format (OMAF) (ISO/IEC Standardization 23090-2) and (ISO/IEC Standardization 23090-7) which is incorporated by reference herein.

Figure 2:
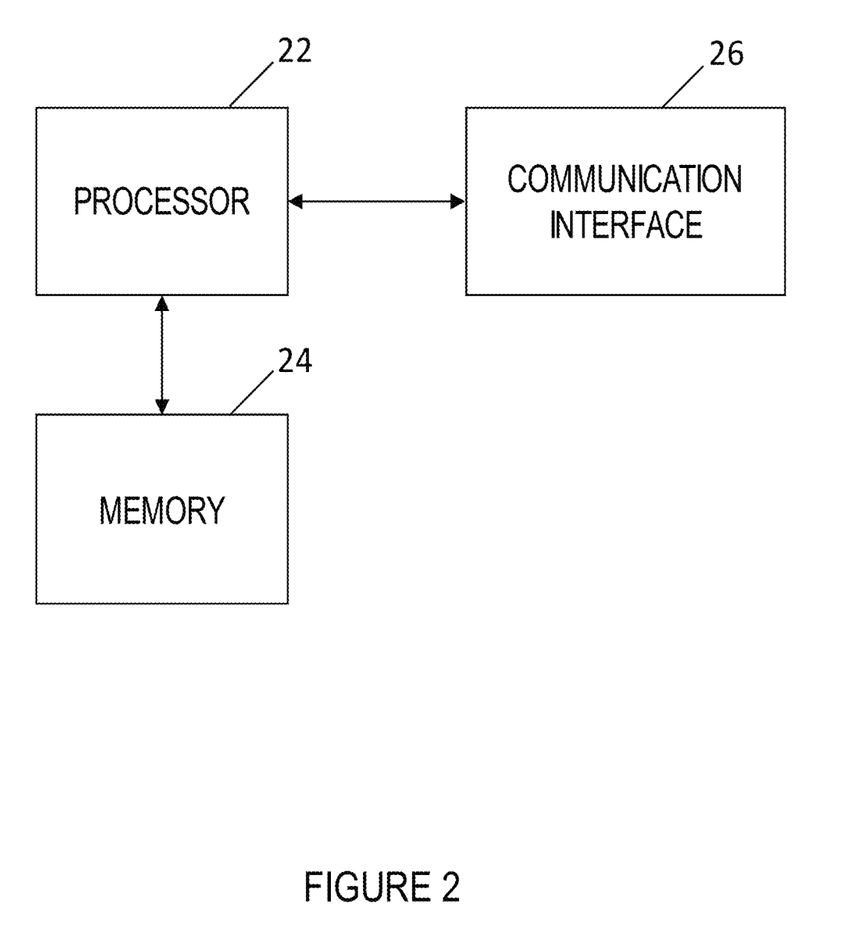
FIG. 2 is a block diagram of an apparatus that may be specifically configured in accordance with an example embodiment of the present disclosure.

One example of an apparatus 200 that may be configured to function as the computing device 102 and/or imaging device 104 is depicted in FIG. 2. As shown in FIG. 2, the apparatus includes, is associated with or is in communication with processing circuitry 22, a memory 24 and a communication interface 26. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including media content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

Figure 3A:
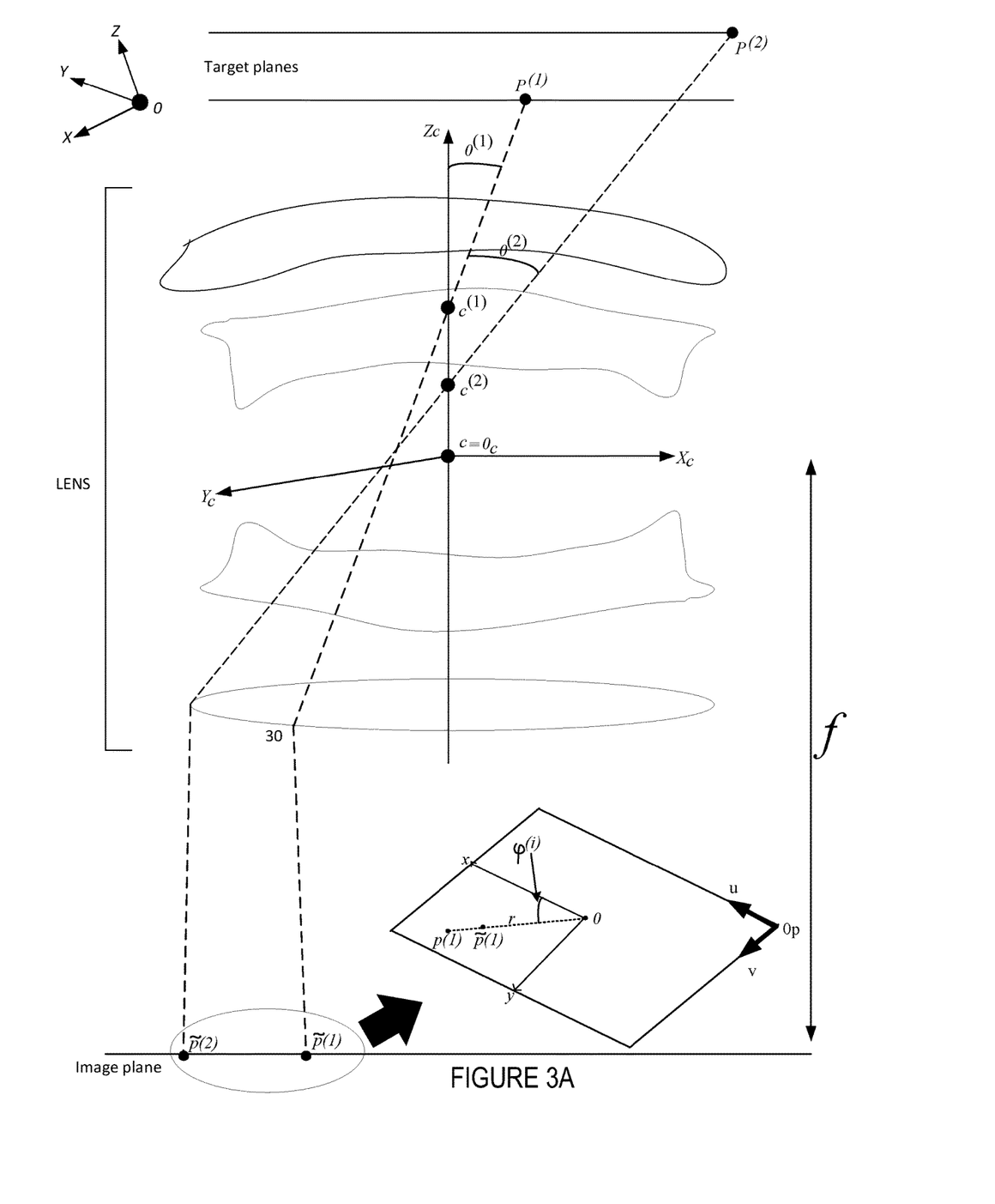
FIGS. 3A-3B are representations of non-single viewpoint image formations and corrections in accordance with an example embodiment of the present disclosure.
Figure 3B:
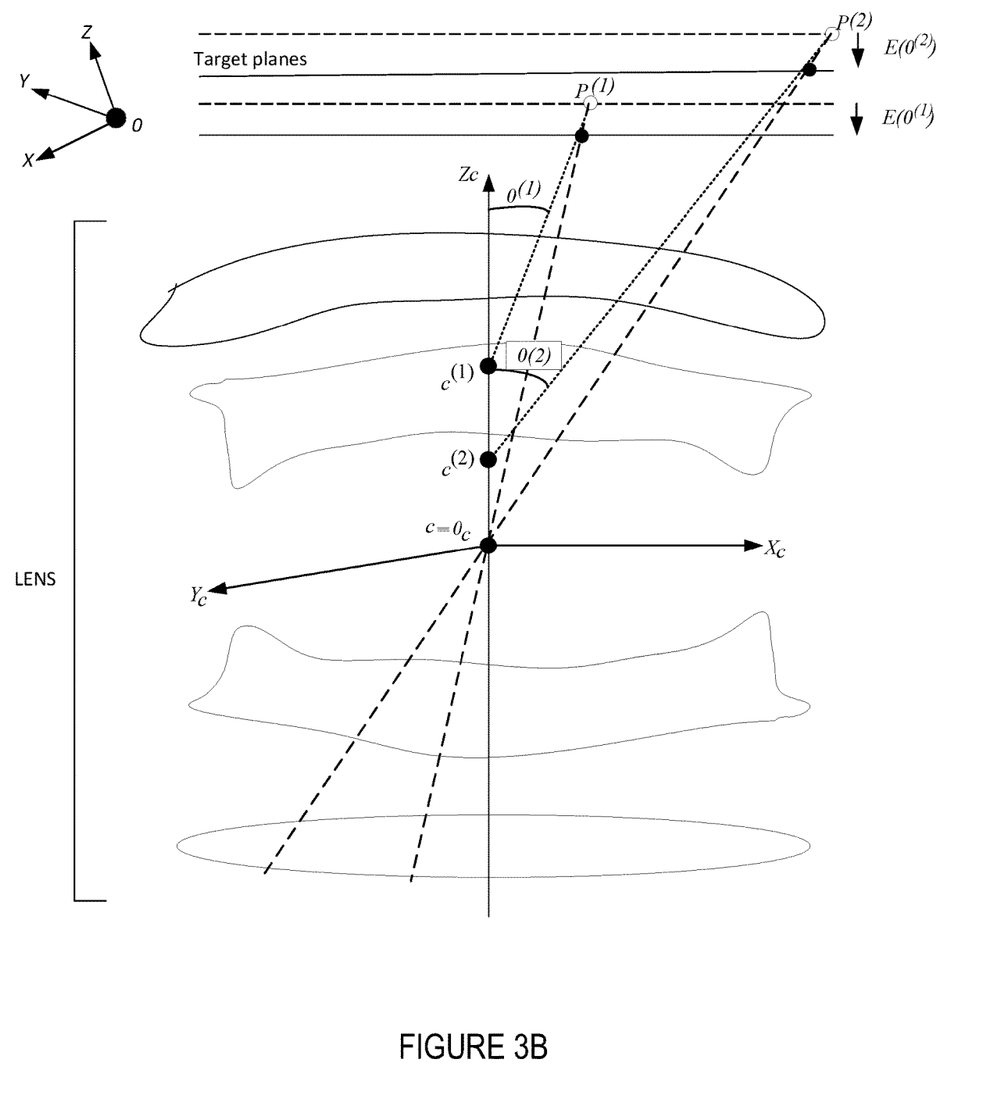

FIGS. 3A-3B depict an example embodiment in which entrance pupil variation may be corrected and from which entrance pupil parameters may be determined. FIG. 3A illustrates NSVP image formation. Points $p^{(1)}$ and $p^{(2)}$ each represent a 3D world point projected through a lens 30, such as a fisheye lens, and onto an image plane at points $\tilde{p}^{(1)}$ and $\tilde{p}^{(2)}$, respectively, as point rays through lens distortion. These point rays both form incidence angles $c^{(1)}$ and $c^{(2)}$ with the optical axis. Assuming no lens distortion is present, the projected image points are $p^{(1)}$ and $p^{(2)}$. In FIG. 3B, entrance pupil variation may be corrected. The world points $p^{(1)}$ and $p^{(2)}$ may be moved in a series of optimizations (detailed below) to an optimal target plane using parameters $E(\theta^{(1)})$ and $E(\theta^{(2)})$.

With reference to FIG. 3A, under NSVP, the projections of the two light sources $p^{(1)}$ and $p^{(2)}$ may be calculated as:

$$\tilde{x}_1 = f_x * (\theta_1 + k1*\theta_1^3 + k2*\theta_1^5 + k3*\theta_1^7 + k4*\theta_1^9) * \cos(\varphi_1) + c_x$$

$$\tilde{y}_1 = f_y * (\theta_1 + k1*\theta_1^3 + k2*\theta_1^5 + k3*\theta_1^7 + k4*\theta_1^9) * \sin(\varphi_1) + c_y$$

In this regard, $\tilde{p}^{(1)}(\tilde{x}^{(1)}, \tilde{y}^{(1)})$ represents the horizontal and the vertical pixel locations $\tilde{x}^{(1)}, \tilde{y}^{(1)}$, respectively, of the projected light onto the sensor area, $P_c^{(1)}(X_c^{(1)}, Y_c^{(1)}, Z_c^{(1)})$ represents the camera coordinate points $X_c^{(1)}, Y_c^{(1)}$ and $Z_c^{(1)}$ along the x, y and z axes, respectively, $\varphi$ is the angle between the radius r and the horizontal image axis, $f_x$ and $f_y$ are the focal lengths along the x and y axes, respectively, $c_x$ and $c_y$ are the principal points along the x and y axes, respectively, and k1, k2, k3 and k4 are lens model parameters.

Further, under NSVP, the two angles $\theta_1$ and $\theta_2$ may be calculated as follows:

$$\theta_1 = a\cos\left(\frac{Z_c^{(1)}}{c^{(1)} P_c^{(1)}}\right);$$

$$\theta_2 = a\cos\left(\frac{Z_c^{(2)}}{c^{(2)} P_c^{(2)}}\right);$$

In order to assume SVP, corrections may be made to the formation to compensate for the off-axis variation of the entrance pupil using the following camera model:

$$\begin{bmatrix} x \\ y \\ 1 \end{bmatrix} = \begin{bmatrix} f_x & 0 & c_x \\ 0 & f_y & c_y \\ 0 & 0 & 1 \end{bmatrix} [R \quad T] \begin{bmatrix} X \\ Y \\ Z + E(\theta) \\ 1 \end{bmatrix}$$

wherein P(X, Y, Z) are the coordinates of the 3D point in world coordinate space, and E(θ) is the function describing the viewpoint location on the optical axis. For the first light source $P^{(1)}$: $E(\theta)=e1*\theta_1^3+e2*\theta_1^5+e3*\theta_1^7+e4*\theta_1^9+e5*\theta_1^{11}$, where e1, e2, e3 and e4 are the entrance pupil parameters, and [R T] is the joint rotation translation matrix, forming the extrinsic parameters These entrance pupil parameters {e1, e2, e3, e4, e5} may be estimated for any fisheye lens as part of the extrinsic parameters. By considering the entrance pupil deviation in the above calculations, this technique ensures that pixels located at the highly distorted extremities of the fisheye lens are corrected and thus have a significant improvement on any subsequent reconstructed 3D and MPEG-OMAF operations.

Figure 4:
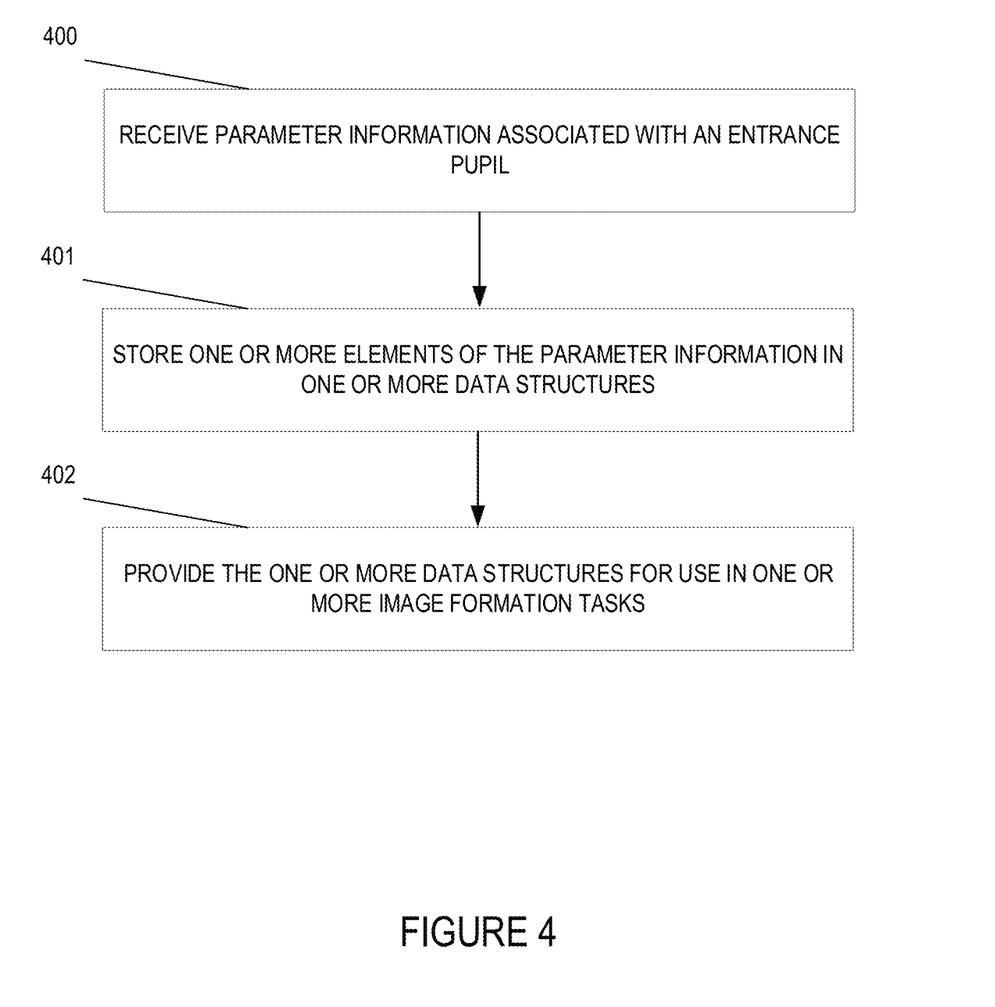
FIG. 4 is a flow chart illustrating the operations performed, such as by the apparatus of FIG. 2, in order to receive, store, and provide parameters associated with an entrance pupil in accordance with an example embodiment.

FIG. 4 illustrates operations that may be performed by the computing device 102 and/or imaging device 104. In this regard, the computing device 102 and/or imaging device 104 includes means, such as the processing circuitry 22, communication interface 26, or the like, for receiving parameter information associated with an entrance pupil of an omnidirectional lens at operation 400. In certain embodiments, the computing device 102 may receive the parameter information from the imaging device 104 and/or via the network 106 after the parameter information was generated at the imaging device and/or the network, such as by way of the calculations detailed above. In other embodiments, the imaging device 104 may receive the parameter information from the computing device 102 and/or via the network 106 after the parameter information was generated at the computing device and/or the network, such as by way of the calculations detailed above. In further embodiments, the parameter information may be both generated and received at the imaging device 104, network 106, or the computing device 102.

The parameter information associated with an entrance pupil may comprise one or more entrance pupil coefficients. Additionally, the parameter information may comprise a value associated with the entrance pupil coefficients, such as the number, or amount, of entrance pupil coefficients provided within the parameter information. In some embodiments, the parameter information may comprise a value associated with an entrance pupil flag, which may be used to signify that entrance pupil coefficients are present within the parameter information. A flag may be defined as a single-bit syntax element that can take one of the two possible values: 0 and 1, to identify to whether entrance pupil coefficients are present or not.

Upon receiving the parameter information, at operation 401, the computing device 102 and/or imaging device 104 may store certain elements of the parameter information in data structures. In this regard, the computing device 102 and/or imaging device 104 includes means, such as the processing circuitry 22, the memory 24 or the like, for storing one or more elements of the parameter information in one or more data structures. For example, the value associated with the amount of entrance pupil coefficients may be stored in a data structure such as an integer variable to be used in further methods and calculations. As another example, the values associated with the one or more entrance pupil coefficients may be stored as integer variables within a data structure such as an array, vector, matrix, and/or the like. As another example, the value associated with an entrance pupil flag may be stored as a Boolean variable.

At operation 402, the computing device 102 and/or imaging device 104 may provide the one or more data structures for use in one or more image formation tasks, such as tasks associated with an omnidirectional media standard. In this regard, the computing device 102 and/or imaging device 104 includes means, such as the processing circuitry 22, communication interface 26 or the like, for providing the one or more data structures for use in one or more image formation tasks, such as tasks associated with an omnidirectional media standard. For example, the omnidirectional media standard may be the MPEG-OMAF standard. In this regard, the one or more data structures may be supplemented and integrated into sphere mapping operations and other image formation tasks associated with immersive video metadata and algorithms associated with MPEG-OMAF. In an embodiment, the one or more image formation tasks may be performed by the computing device 102 and/or imaging device 104. In this regard, the computing device 102 and/or imaging device 104 includes means, such as the processing circuitry 22, communication interface 26 or the like, for converting from a sample location of an active area in a fisheye decoded picture to sphere coordinates relative to a global coordinate axes. In certain embodiments detailed below, the data structures comprising entrance pupil parameter information may be provided to and integrated with the ISO/IEC 23090-7 (Metadata for Immersive Media) specification in sections 6.3, 6.4 and 6.5 respectively.

In an embodiment, providing the one or more data structures for use in one or more image formation tasks may comprise providing and/or inserting the data structures for use in a method for conversion from a sample location of an active area in a fisheye decoded picture to sphere coordinates relative to global coordinate axes. For example, ISO/IEC 23090-7 section 6.3.4 details a sample location mapping process, wherein a method for conversion from a sample location of an active area in a fisheye decoded picture to sphere coordinates relative to a global coordinate axis takes place and comprises determining an angle ϕ' in an effort to ultimately determine an output of sphere coordinates (ϕ', θ) relative to the global coordinate axes. Various inputs are described for this conversion, such as field of view, rotation parameters, and lens projection type, among others. Additionally, in some embodiments, the data structures associated with the entrance pupil coefficients and number, or amount, of entrance pupil coefficients may be provided by the apparatus 200 as additional inputs to the method for conversion.

In this regard, the number of entrance pupil coefficients may be provided as a value referred to in the method as numEPCoeffs and the entrance pupil coefficients may be provided as values referred to in the method as EPcoeffVal of an i-th active area. In an embodiment, numEPCoeffs may be inserted into a clause to instruct the method of converting a sample location of an active area in a fisheye decoded picture to sphere coordinates relative to a global coordinate axis to not use entrance pupil coefficients in the conversion if the number of entrance pupil coefficients is zero. The entrance pupil coefficients and number of entrance pupil coefficients, once provided and/or inserted into the method, may therefore be used as deciding factors for various tasks. For example, if it is determined that entrance pupil coefficients are to be used (e.g., numEPCoeffs is not equal to zero), the processor 22 may be configured to derive an angle φ' by the following equation:

$$\phi' = \sum_{j=0}^{numCoeffs-1} \left( (coeffVal[j] * 2^{-24}) * \left( Sqrt((x - x_c * 2^{-16})^2 + (y - y_c * 2^{-16})^2) \div (r_c + EP) * 2^{-16}) \right)^j \right),$$

wherein x and y represent camera coordinates and $x_c$, $y_c$, $z_c = r_c$ represent normalized camera coordinates, wherein EP represents the entrance pupil and:

$$EP = \sum_{j=0}^{numCoeffs-1} \left( (EPcoeffVal[j] * 2^{-24}) * \left( Sqrt((x - x_c * 2^{-16})^2 + (y - y_c * 2^{-16})^2) \div (r_c * 2^{-16}) \right)^j \right),$$

wherein x and y represent camera coordinates and $x_c$, $y_c$, $z_c = r_c$ represent normalized camera coordinates.

By providing the entrance pupil coefficients and the number of entrance pupil coefficients to the conversion method, the outputs to this conversion may then be derived by the processor 22 as follows:

$\theta' = A\tan 2(y - y_c \div 2^{16}, x - x_c \div 2^{16})$ $x_1 = \cos(\phi')$ $y_1 = \sin(\phi') * \cos(\theta')$ $z_1 = \sin(\phi') * \sin(\theta')$ $\alpha = (\alpha_c \div 2^{16}) * \pi \div 180$ $\beta = (\beta_c \div 2^{16}) * \pi \div 180$ $\gamma = (\gamma_c \div 2^{16}) * \pi \div 180$ $x_2 = \cos(\beta) * \cos(\gamma) * x_1 - \cos(\beta) * \sin(\gamma) * y_1 + \sin(\beta) * z_1$ $y_2 = (\cos(\alpha) * \sin(\gamma) + \sin(\alpha) * \sin(\beta) * \cos(\gamma)) * x_1 + (\cos(\alpha) * \cos(\gamma) - \sin(\alpha) * \sin(\beta) * \sin(\gamma)) * y_1 - \sin(\alpha) * \cos(\beta) * z_1$ $z_2 = (\sin(\alpha) * \sin(\gamma) - \cos(\alpha) * \sin(\beta) * \cos(\gamma)) * x_1 + (\sin(\alpha) * \cos(\gamma) + \cos(\alpha) * \sin(\beta) * \sin(\gamma)) * y_1 + \cos(\alpha) * \cos(\beta) * z_1$ $\phi = A\tan 2(y_2, x_2) * 180 \div \pi$ $\theta = A\sin(z_2) * 180 \div \pi$ ISO/IEC 23090-7 section 6.4 describes fisheye omnidirectional video and discusses that multiple circular images captured by fisheye cameras may be directly projected onto a picture, which consists of fisheye omnidirectional video. In an OMAF player, the decoded fisheye omnidirectional video may be stitched and rendered according to the user's intended viewport using the signalled fisheye video parameters. These parameters may include region information of circular images in the coded picture, field-of-view and camera parameters of fisheye lens, lens distortion correction (LDC) parameters with local variation of field-of-view, and lens shading compensation (LSC) parameters with red green blue (RGB) gains. The one or more data structures may be provided for use in one or more image formation tasks by providing entrance pupil distortion correction (EDC) parameters with local variation of field-of-view. In this regard, in an OMAF player, the decoded fisheye omnidirectional video may be stitched and rendered according to the user's intended viewport using signalled fisheye video parameters including EDC parameters provided by apparatus 200.

ISO/IEC 23090-7 section 6.5 describes video and image metadata data structures associated with conversion from a sample location of an active area in a fisheye decoded picture to sphere coordinates relative to the global coordinate axes. This section further describes the syntax of a fisheye video supplemental information structure as FisheyeVideoSupplementalInfoStruct. In this regard, the computing device 102 and/or imaging device 104 includes means, such as the processing circuitry 22, or the like, for providing the entrance pupil flag variable to the fisheye supplemental information structure. When provided to the fisheye supplemental information structure, the entrance pupil flag may be used at various decision points within the structure, and have influence over subsequent parameters if activated, as seen in the below example:

```
aligned(8) class
FisheyeVideoSupplementalInfoStruct(container_box_vers
ion) {
    unsigned int(8) num_circular_images;
    bit(19) reserved = 0;
    unsigned int(1) EP_flag;
    unsigned int(1) flip_info_flag;
    unsigned int(1) camera_intrinsic_flag;
    unsigned int(1) local_fov_flag;
    unsigned int(1) deadzone_flag;
    for (i=0; i<num_circular_images; i++) {
        if (container_box_version > 0) {
            unsigned int(4)
lens_projection_type;
            bit(4) reserved = 0;
        }
        if (EP_flag == 1) {
            unsigned int (16) num_EP_coeffs;
            for (j=0; j< num_EP_coeffs; j++)
                signed int(32) EP_coeff;
        }
```

Figure 5A:
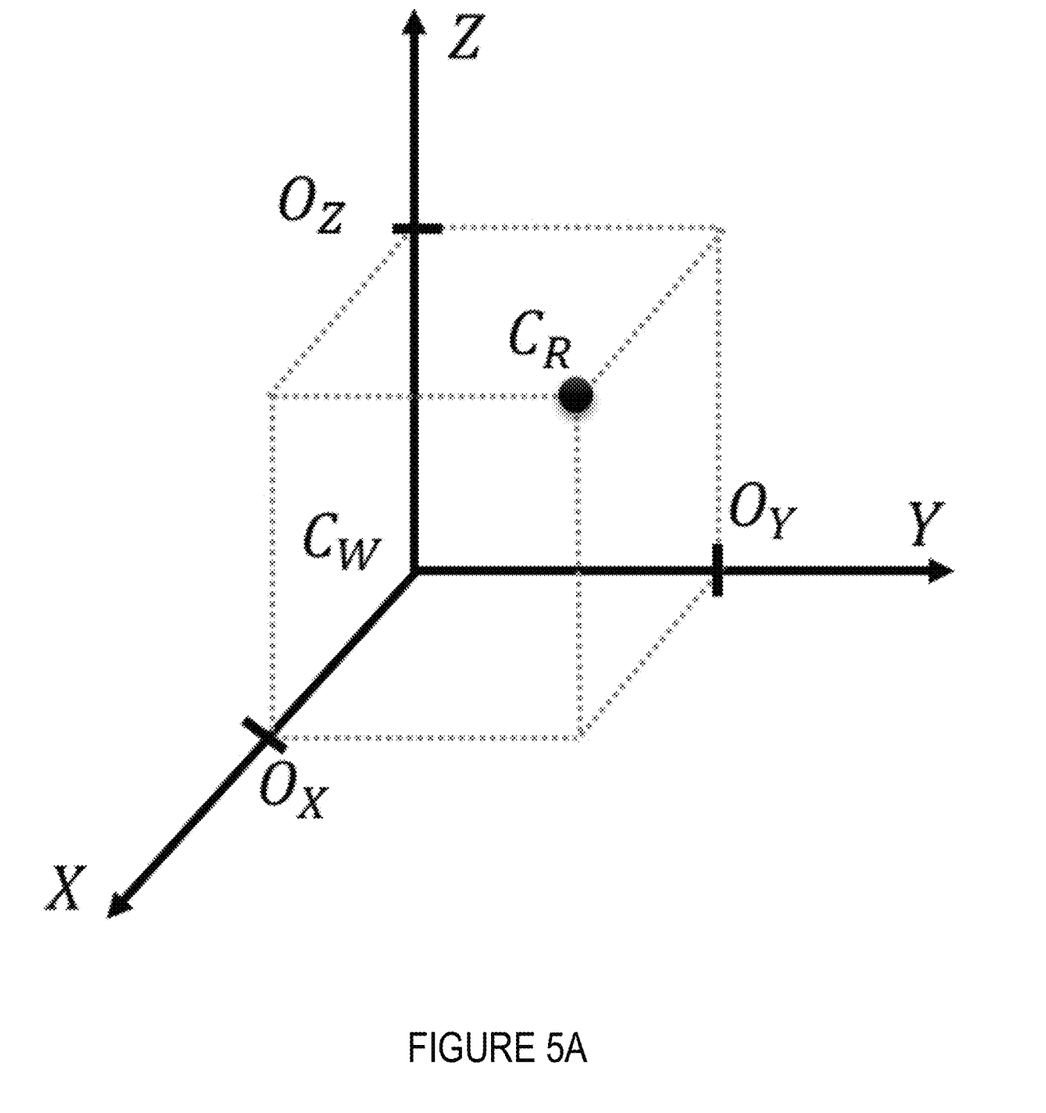
FIGS. 5A and 5B illustrate a representation of entrance pupil rectification on a Z-axis in accordance with an example embodiment of the present disclosure.
Figure 5B:
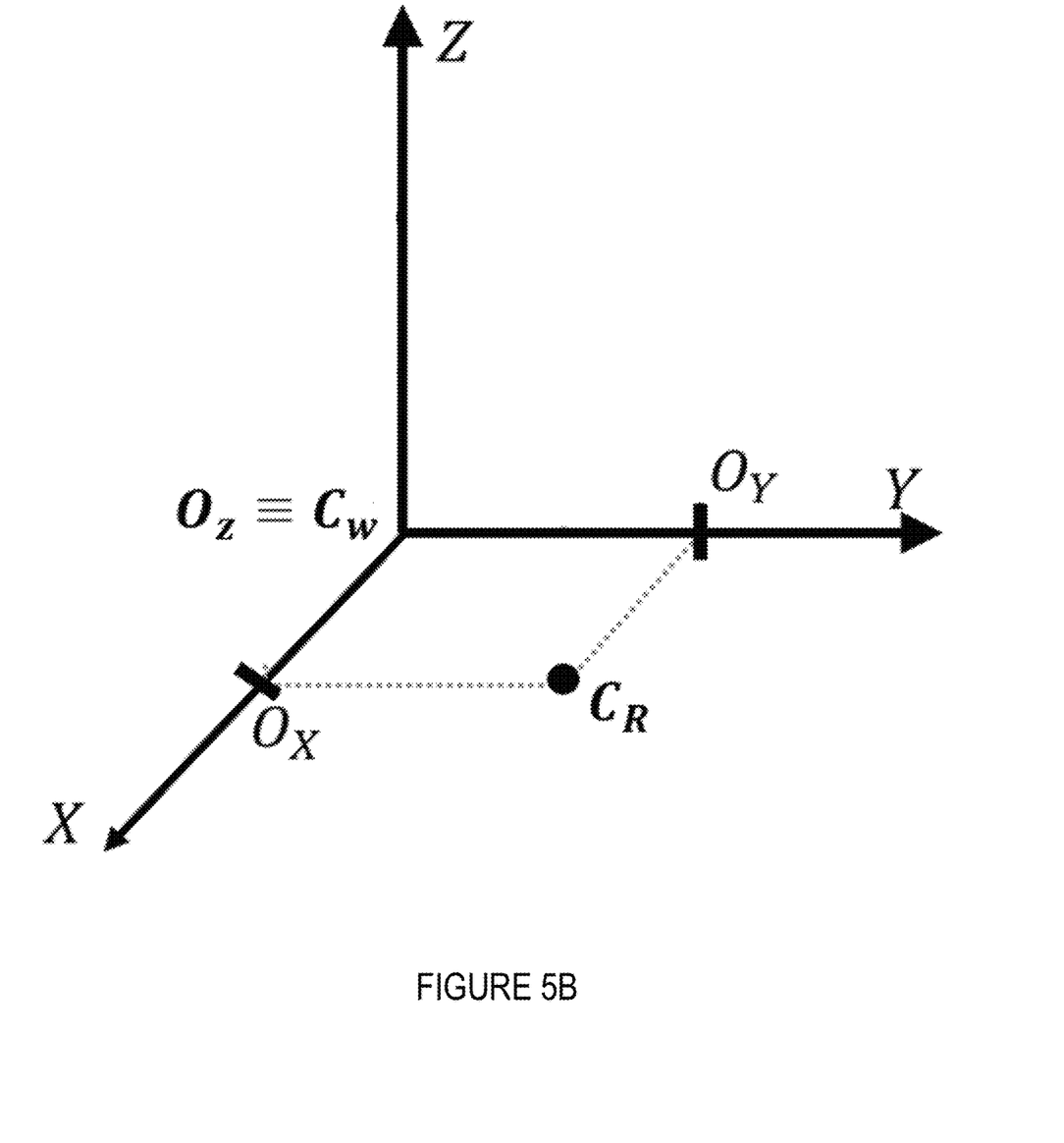

ISO/IEC 23090-7 section 6.6.3.2.1 describes semantics, such as attributes, of the above described fisheye video supplemental information structure. FIGS. 5A and 5B provide an illustration of entrance pupil rectification on the Z-axis. The Z-axis may represent a world coordinate. In conjunction with this section, entrance pupil distortion parameters provided by apparatus 200 may be used to correct a camera_centre_offset_z($O_z$), as seen in FIG. 5A, to its real optical center ($C_w$), shown in FIG. 5B, in the external camera coordinate. This approach is required to improve the modeling of fisheye lenses. Non-correction of the entrance pupil impacts object images at certain view angles, such as view angles between 180 and 290 degrees and closer to the lens. Full correction when considering entrance pupil variation may be computed by the processor 22 in accordance with the following equation:

$$\theta = \sum_{j=0}^{N_i-1} p_j * r^j + EP(\theta)$$

wherein $p_j$ and $N_i$ are represented by polynomial_coeff and num_polynomial_coeffs, respectively. The instances of polynomial EP_coeffs may be fixed-point or floating-point polynomial coefficient values that describe the curve function using the following entrance pupil equation:

$$EP(\theta) = \sum_{j=3}^{N_i^2-1} p_j^2 * r^j$$

where $p_j^2$ and $N_i^2$ are represented by EP_coeffs and num_EP_coeffs, respectively. Further, if the entrance pupil flag is specified (e.g., equal to 1 or 'TRUE'), then:

$$w = \sum_{j=1} p_{i-1} \cdot r^{j-1} + EP,$$

wherein w is a compensating weight for a shading effect of the fisheye lens. However, this weight may be used for other image transformation tasks and operations and is not limited to only shading effects.

As described above, a method, apparatus, and computer program product are disclosed for receiving, storing, and providing parameter information associated with an entrance pupil of a lens. By providing for these entrance pupil parameters to be supplemented into omnidirectional media standards and immersive video algorithms and methods, lens distortion introduced in an image caused by variation and positioning of an entrance pupil may be accurately corrected, even in conjunction with omnidirectional lenses, such as fisheye lenses. Benefits of this design include visual improvement in applications such as scene rendering and content playback for omnidirectional lenses.

FIG. 4 illustrates a flowchart depicting methods according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving parameter information associated with an entrance pupil of an omnidirectional lens, wherein the parameter information comprises one or more entrance pupil coefficients and a value representing a total number of entrance pupil coefficients;
storing one or more elements of the parameter information in one or more data structures; and
providing the one or more data structures for use in one or more image formation tasks,
wherein the parameter information further comprises entrance pupil distortion correction parameters, and wherein the entrance pupil distortion correction parameters are used to correct a camera_centre_offset ($O_z$) to its real optical center ($C_W$) in external camera coordinates, and
wherein full correction under varying entrance pupil equates to $\theta = \sum_{j=0}^{N_i-1} p_j * r^j + EP(\theta)$, wherein $\theta$ represents an angle of a sphere coordinate from a normal vector of a nominal imaging plane that passes through a center of a sphere coordinate system for an active area of a circular image, N represents a total number of entrance pupil coefficients, $p_j$ represents a polynomial coefficient, r represents a normalized distance of a luma sample from a center of the circular image, and $EP(\theta)$ represents an entrance pupil equation $\sum_{j=3}^{M_i-1} q_j * r^j$, wherein $M_i$ represents three more than the total number of entrance pupil coefficient and $q_j$ represents one or more instances of ep_coeff.

2. The method according to claim 1, wherein the one or more image formation tasks comprise a polynomial EP_coeffs, wherein instances of EP_coeffs are fixed-point or floating-point polynomial coefficient values that describe a curve function using entrance pupil equation $EP(\theta) \sum_{j=3}^{N_i^2-1} p_j^2 * r^j$, and wherein $p_j^2$ and $N_i^2$ are represented by EP_coeffs and the value representing the total number of entrance pupil coefficients, num_EP_coeffs, respectively.

3. The method according to claim 1, wherein the parameter information further comprises an entrance pupil flag variable for use in a fisheye video supplemental information strut tore.

4. The method according to claim 3, wherein providing the one or more data structures for use in one or more image formation tasks comprises providing the entrance pupil flag variable to the fisheye video supplemental information structure.

5. The method according to claim 1, wherein the one or more image formation tasks are associated with an omnidirectional media standard.

6. The method according to claim 5, wherein the omnidirectional media standard is Moving Pictures Experts Group-Omnidirectional Media Format (MPEG-OMAF) or MPEG International Organization for Standardization/International Electrotechnical Commission (ISO/IEC) 23090-7.

7. An apparatus comprising:
at least one processor; and
at least one memory including computer program code, the at least one memory and the computer program code configured to, with the at least one processor, cause the apparatus at least to:
receive parameter information associated with an entrance pupil of an omnidirectional lens, wherein the parameter information comprises one or more entrance pupil coefficients and a value representing a total number of entrance pupil coefficients;
store one or more elements of the parameter information in one or more data structures; and
provide the one or more data structures for use in one or more image formation tasks,
wherein the parameter information further comprises entrance pupil distortion correction parameters, and wherein the entrance pupil distortion correction parameters are used to correct a camera_centre_offset ($O_Z$) to its real optical center ($C_W$) in external camera coordinates, and
wherein full correction under varying entrance pupil equates to $\theta=\Sigma_{j=0}^{N_i-1} p_j * r^j + EP(\theta)$, wherein $\theta$ represents an angle of a sphere coordinate from a normal vector of a nominal imaging plane that passes through a center of a sphere coordinate system for an active area of a circular image, N represents a total number of entrance pupil coefficients, $p_j$ represents a polynomial coefficient, r represents a normalized distance of a luma sample from a center of the circular image, and $EP(\theta)$ represents an entrance pupil equation $\Sigma_{j=3}^{M_i-1} q_j * r^j$, wherein $M_i$ represent three more than the total number of entrance pupil coefficient and $q_j$ represents one or more instances of ep_coeff.

8. The apparatus according to claim 7, wherein the one air more image formation tasks comprise a polynomial EP_coeffs, wherein instances of EP_coeffs are fixed-point or floating point polynomial coefficient values that describe a curve function using entrance pupil equation $EP(\theta)=\Sigma_{j=3}^{N_i^2-1} p_j^2 * r^j$, and wherein $p_j^2$ and $N_i^2$ are represented by EP_coeffs and the value representing the total number of entrance pupil coefficients, num_EP_coeffs, respectively.

9. The apparatus according to claim 7, wherein the parameter information further comprises an entrance pupil flag variable for use in a fisheye video supplemental information structure.

10. The apparatus according to claim 9, wherein providing the one or more data structures for use in one or more image formation tasks comprises providing the entrance pupil flag variable to the fisheye video supplemental information structure.

11. The apparatus according to claim 7, wherein the one or more image formation tasks are associated with an omnidirectional media standard.

12. The apparatus according to claim 11, wherein the omnidirectional media standard is Moving Pictures Experts Group-Omnidirectional Media Format (MPEG-OMAF) or MPEG international Organization for Standardization/International Electrotechnical Commission (ISO/IEC) 23090-7.

13. A computer program product comprising a non-transitory computer readable storage medium having program code portions stored thereon, the program code portions configured, upon execution, to:
receive parameter information associated with an entrance pupil of an omnidirectional lens, wherein the parameter in formation comprises one or more entrance pupil coefficients and a value representing a total number of entrance pupil coefficients;
store one or more elements of the parameter information in one or more data structures; and
provide the one or more data structures for use in one or more image formation tasks,
wherein the parameter information further comprises entrance pupil distortion correction parameters, and wherein the entrance pupil distortion correction parameters are used to correct a camera_centre_outset ($O_Z$) to its real optical center ($C_W$) in external cameral coordinates, and
wherein herein full correction ion under varying entrance pupil equates to $\theta=\Sigma_{j=0}^{N_i-1} p_j * r^j + EP(\theta)$, wherein $\theta$ represents an angle of a sphere coordinate from a normal vector of a nominal imaging plane that passes through a center of a sphere coordinate system for an active area of a circular image, N represents a total number of entrance pupil coefficients, $p_j$ represents a polynomial coefficient, r represents a normalized distance of a luma sample from a center of the circular image, and $EP(\theta)$ represents an entrance pupil equation $\Sigma_{j=3}^{M_i-1} q_j * r^j$, wherein $M_i$ represents three more than the total number of entrance pupil coefficients and $q_j$ represents one or more instances of ep_coeff.

14. The computer program product according to claim 13, wherein the one or more image formation tasks comprise a polynomial EP_coeffs, wherein instances of EP_coeffs are fixed-point or floating-point polynomial coefficient values that describe a curve function using entrance pupil equation $EP(\theta)=\Sigma_{j=3}^{N_i^2-1} p_j^2 * r^j$, and wherein $p_j^2$ and $N_i^2$ are represented by EP_coeffs and the value representing the total number of entrance pupil coefficients, num_EP_coeffs, respectively.

15. The computer program product according to claim 13, wherein the parameter information further comprises an entrance pupil flag variable for use in a fisheye video supplemental information structure.

16. The computer program product according to claim 15, wherein the program code portions being configured to provide the one or more data structures for use in one or more image formation tasks comprise, program code portions configured to provide the entrance pupil flag variable to the fisheye video supplemental information structure.

17. The computer program product according to claim 13, wherein the one or more image formation tasks are associated with an omnidirectional media standard.

18. The computer program product according to claim 17, wherein the omnidirectional media standard is Moving Pictures Experts Group-Omnidirectional Media Format (MPEG-OMAF) or MPEG International Organization for Standarization/International Electrotechnical Commission (ISO/IEC), 23090-7.

* * * * *

UNITED STATES PATENT AND TRADEMARK OFFICE
CERTIFICATE OF CORRECTION

PATENT NO. : 11,336,812 B2
APPLICATION NO. : 16/902346
DATED : May 17, 2022
INVENTOR(S) : Peter O. Fasogbon et al.

It is certified that error appears in the above-identified patent and that said Letters Patent is hereby corrected as shown below:

In the Claims

In Column 18, Claim 1, Line 38, delete "($O_z$)" and insert -- ($O_Z$) --, therefor.

In Column 18, Claim 2, Line 59, delete "$EP(\theta)\Sigma_{j=3}^{N_i^2-1} p_j^{2}*r^j$," and insert
-- $EP(\theta) = \sum_{j=3}^{N_i^2-1} p_j^2 * r^j$ --, therefor.

In Column 18, Claim 3, Line 65, delete "strut tore." and insert -- structure. --, therefor.

In Column 19, Claim 8, Line 47, delete "air" and insert -- or --, therefor.

In Column 20, Claim 12, Line 4, delete "international" and insert -- International --, therefor.

In Column 20, Claim 13, Line 12, delete "in formation" and insert -- information --, therefor.

In Column 20, Claim 13, Line 22, delete "camera_centre_outset" and insert
-- camera_centre_offset --, therefor.

In Column 20, Claim 13, Line 23, delete "cameral" and insert -- camera --, therefor.

In Column 20, Claim 13, Line 25, delete "wherein herein" and insert -- wherein --, therefor.

In Column 20, Claim 13, Line 25, delete "correction ion" and insert -- correction --, therefor.

In Column 20, Claim 13, Line 54, delete "comprise," and insert -- comprise --, therefor.

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,336,812 B2

In Column 20, Claim 18, Line 64, delete "Standarization" and insert -- Standardization --, therefor.

In Column 20, Claim 18, Line 65, delete "(ISO/IEC), 23090-7." and insert -- (ISO/IEC) 23090-7. --, therefor.